F. O. BOSWELL.
AUTOMOBILE LOCK.
APPLICATION FILED MAY 1, 1920.
1,368,602.
Patented Feb. 15, 1921.
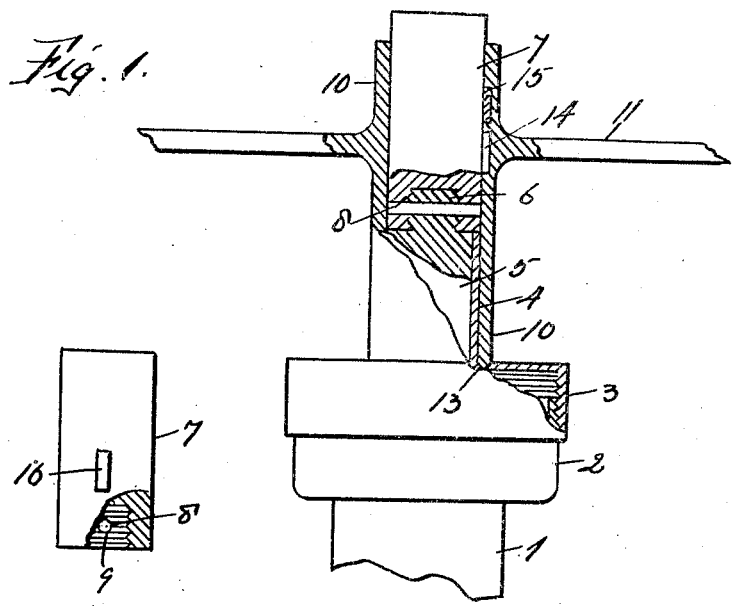
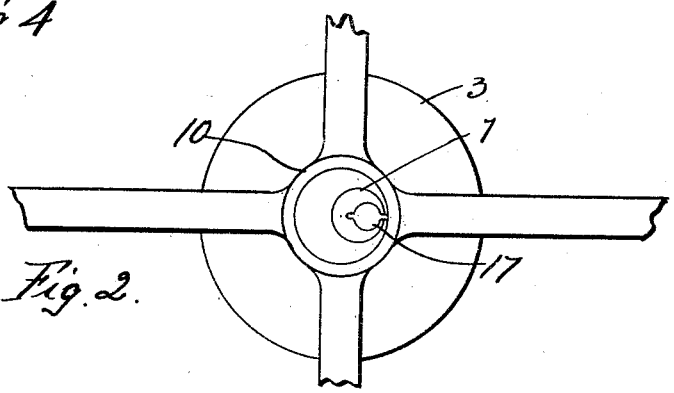
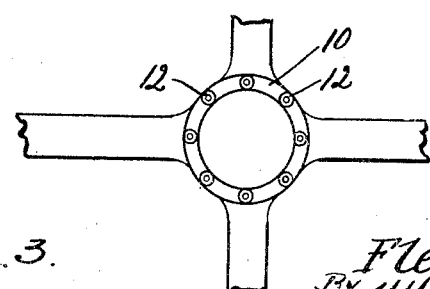
Inventor
Fletcher O. Boswell
By W. W. Williamson
Atty.

UNITED STATES PATENT OFFICE.

FLETCHER O. BOSWELL, OF PHILADELPHIA, PENNSYLVANIA.

AUTOMOBILE-LOCK.

1,368,602.

Specification of Letters Patent.  Patented Feb. 15, 1921.

Application filed May 1, 1920. Serial No. 378,050.

*To all whom it may concern:*

Be it known that I, FLETCHER O. BOSWELL, a citizen of the United States, residing at Philadelphia, in the county of Philadelphia and State of Pennsylvania, have invented new and useful Improvements in Automobile-Locks, of which the following is a specification.

My invention relates to a new and useful improvement in automobile locks for locking the steering gear of the machine, and is especially adapted for use upon automobiles as the type known as the Ford, and has for its object to provide an exceedingly simple and effective lock of this description which may be readily applied to the steering post of the machine and utilized for locking the steering wheel either to the steering post so as to cause the latter to turn therewith or to said post and the stationary casing surrounding the post thereby preventing the revolving of the wheel and consequently the revolving of the post.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawing forming a part of this application, in which:—

Figure 1, is an elevation of a portion of the steering gear casing showing a portion of the steering wheel partially in section and my improved lock applied to the steering post.

Fig. 2 is a plan view of Fig. 1.

Fig. 3, is a detail view of a portion of the steering wheel looking upward to show the clutch teeth on the hub of said wheel.

Fig. 4 is a detail view of the lock removed from its steering post.

In carrying out my invention as here embodied, 1 represents the steering post casing of the Ford type of automobile having the enlargement 2 upon the upper end thereof upon which is screwed the cap 3, said cap being made stationary with the enlargement 2 in any well known manner, and this cap is provided with the tubular extension 4 through which the steering post 5 projects. The upper end of the steering post is reduced in diameter to form the threaded stud 6 for the purpose hereafter explained.

7 represents the lock which is preferably of the well known pin tumbler type, said lock having a threaded recess 8 in the lower end thereof for screwing upon the threaded stud 6, and in order that the lock may be made immovable relative to the post a pin 8 is driven into suitable holes 9 formed crosswise of the threaded recess 8, and through a suitable hole in the threaded stud as clearly shown in Fig. 1.

The diameter of the lock coincides with the outside diameter of the extension 4 so as to form a continuous bearing for the hub 10 of the steering wheel 11, and this hub is adapted to slide up and down upon this continuous bearing.

The lower face of the hub 10 has formed or secured thereon the clutch teeth 12, and these teeth are adapted to engage with a corresponding series of holes or depressions 13 formed in the upper face of the cap 3 around the base of the extension 4 so that when the hub of the steering wheel is slid downward upon its bearing these clutch teeth will enter into engagement with the depressions 13 and thereafter be prevented from turning so long as these clutch teeth are in engagement.

Within the hub 10 are formed two keeper recesses 14 and 15 into which the bolt 16 of the lock is adapted to be shot, and when the hub is in its lowered position just described, the bolt may be shot into the keeper recess 15 by turning the barrel 17 of the lock with a suitable key and this will hold the clutch teeth in engagement, and at the same time lock the steering wheel to the steering post 6, thus effectually preventing the manipulation of the steering mechanism for running the automobile. When it is desired to release the clutch teeth from their depressions the lock bolt 16 is retracted from the keeper recess 15, the wheel raised upward and the lock bolt shot into the keeper recess 14 which will hold the wheel in its elevated position and at the same time lock it to the steering post so that thereafter the automobile may be steered by turning the wheel to and fro in the usual manner.

When the wheel is locked to the cap 3 as before described the upper end of the lock 7 will be exposed so as to indicate to the eye that the wheel is locked thereby warning the driver that the wheel is to be unlocked before starting the automobile, and when the wheel is in its elevated position and locked to the post the upper edge of the hub of the wheel will lie flush with the upper end of the lock, this indicating that the wheel is in position for steering the machine, and in practice this is of considerable advantage since it avoids accidents from carelessness. Another advantage of my invention is that the wheel is locked to the post both in its lowered and elevated positions, thus preventing rattle from vibration, and also overcoming the possibility of the clutch teeth accidentally entering into engagement with the clutch depressions when the machine is in operation.

Of course I do not wish to be limited to the exact details of construction as herein shown as these may be varied within the limits of the appended claims without departing from the spirit of my invention.

Having thus fully described my invention, what I claim as new and useful is:—

1. In a device of the character described, a stationary casing having clutch recesses therein, a steering wheel hub carrying clutch teeth adapted to enter into engagement with said recesses, a steering post passing through said casing, a lock secured upon the upper end of said post within the steering wheel hub, two keeper recesses formed in said hub adapted to receive the bolt of the lock so as to hold said hub in either a lowered or elevated position.

2. An automobile steering gear lock comprising a stationary casing, a steering post projecting through said casing, a lock secured upon the upper end of said post, a wheel hub adapted to slide upon said lock, keeper recesses formed in said hub, means for shooting a locking bolt into said recesses, and clutch teeth formed upon the lower face of said hub, said teeth adapted to enter into engagement with recesses formed in the stationary casing.

3. The herein described combination of a stationary casing, a cap secured to said casing, said cap having clutch recesses formed therein, an extension formed with said cap, a steering post extending through the casing and extension, a threaded stud formed upon the upper end of the post, a lock corresponding in diameter with the outer diameter of the extension, said lock having a threaded recess for screwing upon said stud, a pin passed through the lock and the stud for securing the same together, a steering wheel hub fitted to slide upon said extension and lock, two keeper recesses formed in the hub, means for shooting a locking bolt into either of the keeper recesses, and clutch teeth formed upon the lower end of the hub for engagement with said clutch recesses.

In testimony whereof, I have hereunto affixed my signature.

FLETCHER O. BOSWELL.